United States Patent [19]

Gogins

[11] 4,333,555
[45] Jun. 8, 1982

[54] VARIABLE SPEED TRANSMISSION

[75] Inventor: Laird B. Gogins, Salt Lake City, Utah

[73] Assignee: Power-Matic Corporation, Salt Lake City, Utah

[21] Appl. No.: 133,416

[22] Filed: Mar. 24, 1980

Related U.S. Application Data

[62] Division of Ser. No. 945,123, Sep. 25, 1978, Pat. No. 4,194,407.

[51] Int. Cl.³ .............................................. F16D 31/00
[52] U.S. Cl. ................................. 192/58 R; 192/41 R; 192/43
[58] Field of Search ...................... 192/41 R, 43, 58 R

[56] References Cited

U.S. PATENT DOCUMENTS

| 887,781 | 5/1908 | Fischer | 192/58 R |
|---|---|---|---|
| 3,049,207 | 8/1962 | Maier | 192/58 R |
| 3,058,557 | 10/1962 | Zierick | 192/58 R |
| 3,133,617 | 5/1964 | Hartmann | 192/58 R |

Primary Examiner—Allan D. Herrmann
Attorney, Agent, or Firm—Curtis, Morris & Safford

[57] ABSTRACT

The variable speed transmission includes a power input drive shaft and a variable throw crank having a zero throw position aligned with the input shaft. The variable throw crank is coupled to the input shaft for rotation therewith and its eccentricity with respect to the axis of rotation of the input shaft can be varied. A control plate, also referred to as a master link, is rotatably mounted on the crank and a plurality of clutches having input and output shafts are operatively connected to the control plate through a plurality of pitman type links, whereby the control plate oscillates the input shafts of the clutches upon rotation of the power input shaft and variable throw crank of the transmission. The outputs of the clutches are connected to an output shaft for the transmission. By varying the throw of the variable throw crank the ratio between the rotary speed of the output shaft can be infinitely adjusted from zero to a maximum ratio determined by the maximum eccentricity of the variable throw crank with respect to the axis of rotation of the input shaft. A preferred embodiment is to revert the above.

3 Claims, 17 Drawing Figures

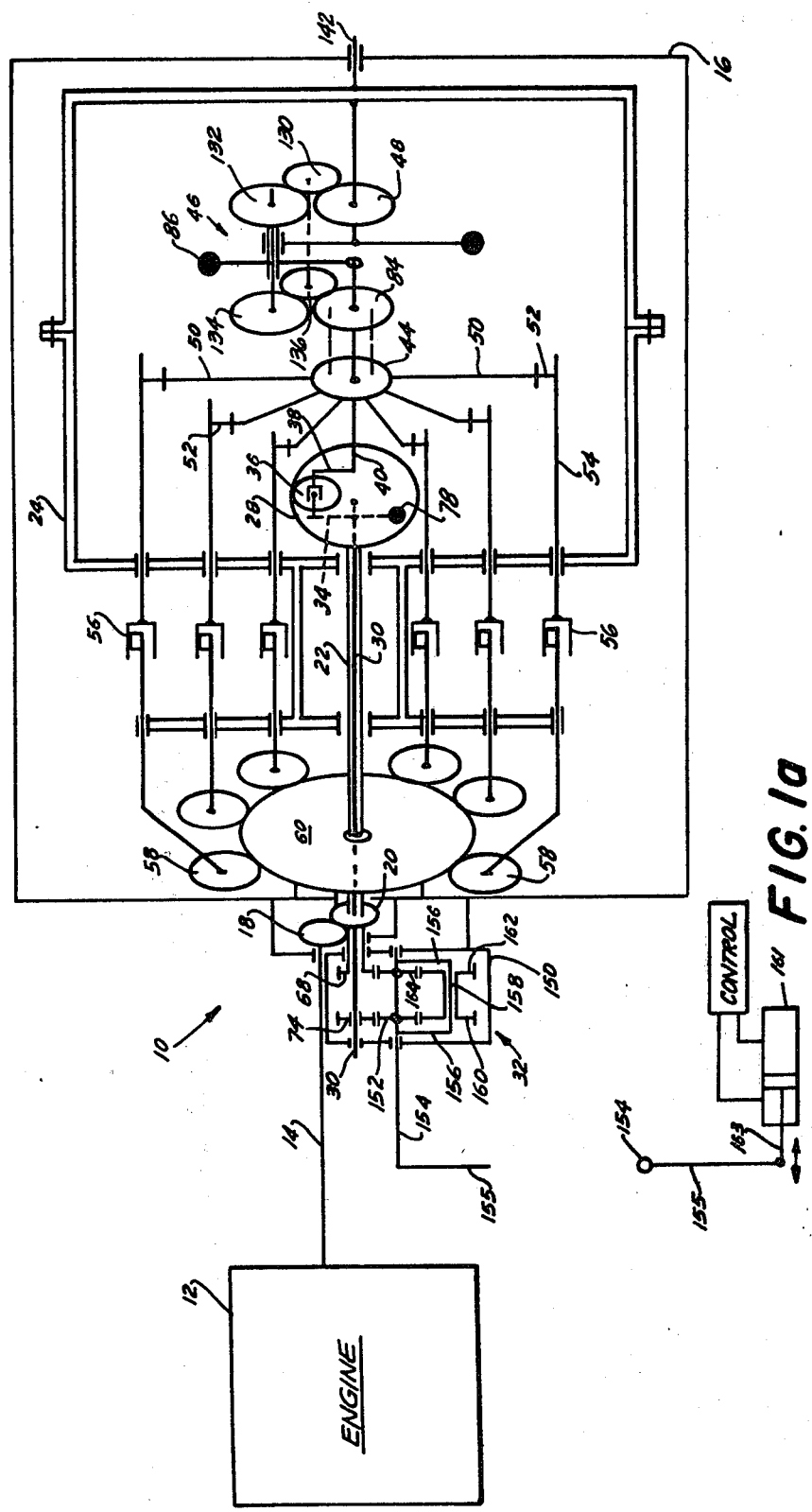

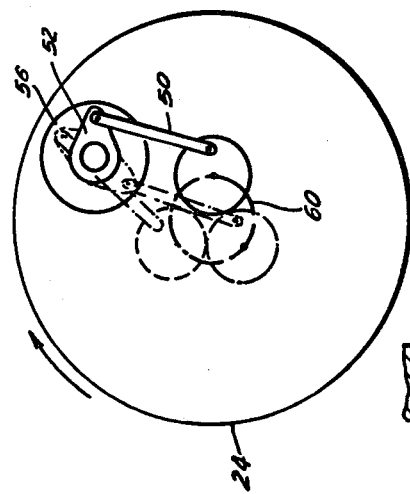
FIG. 4
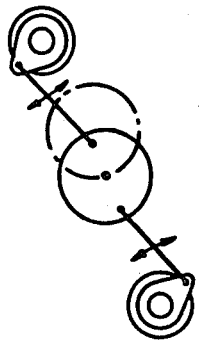
FIG. 3
FIG. 2
FIG. 13a
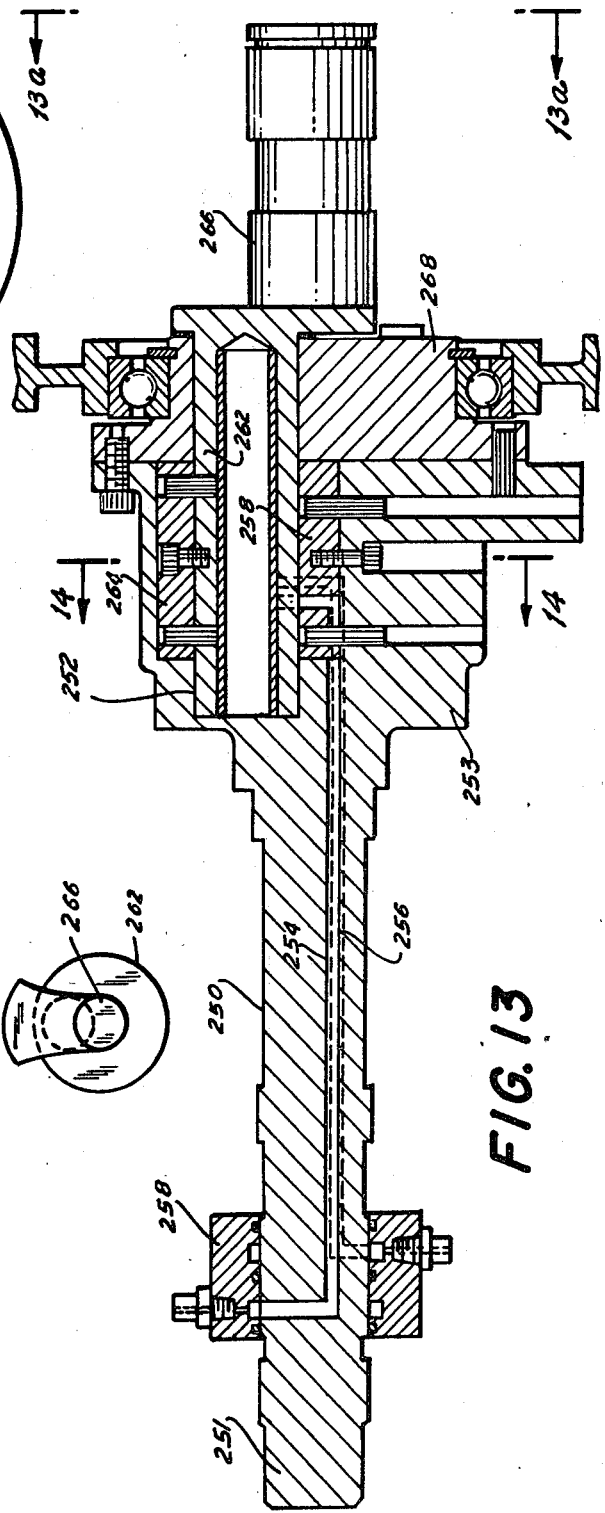
FIG. 13

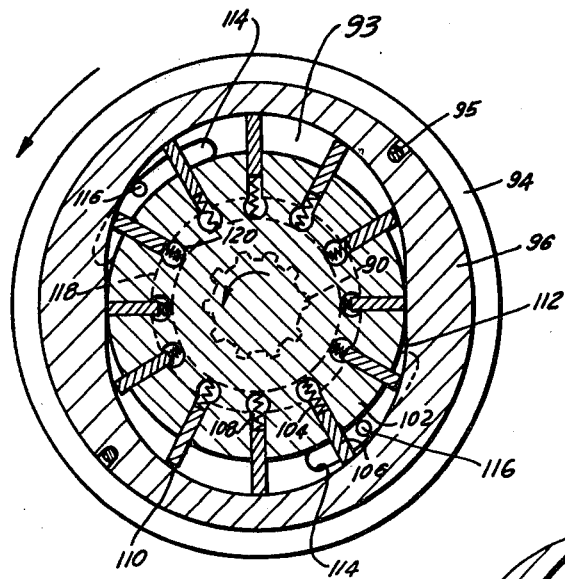
FIG. 5a
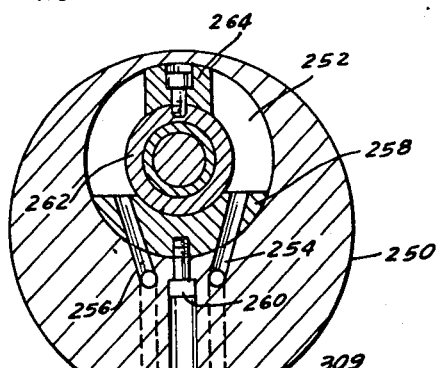
FIG. 14
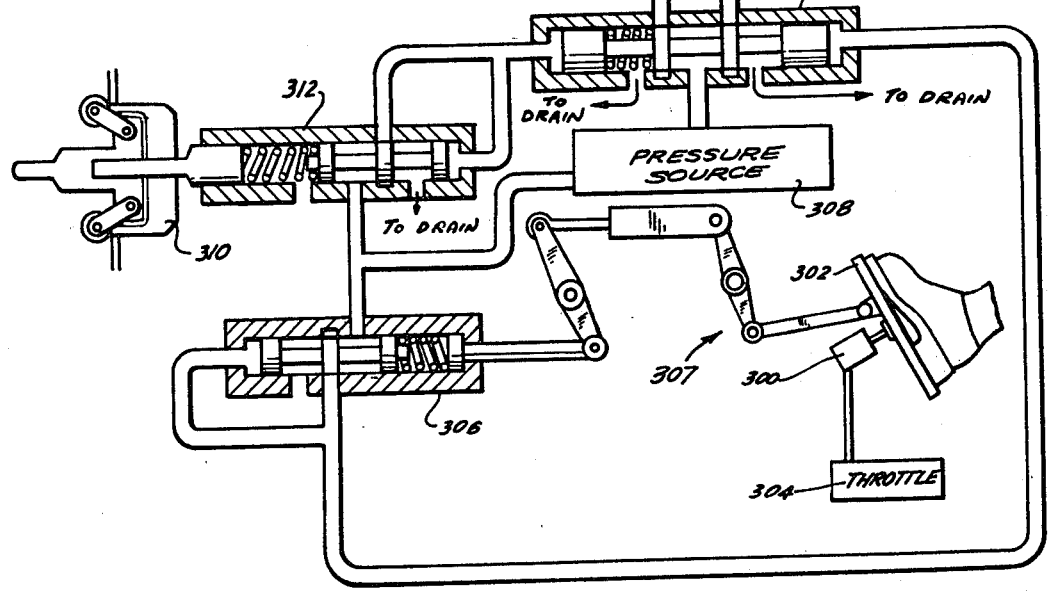

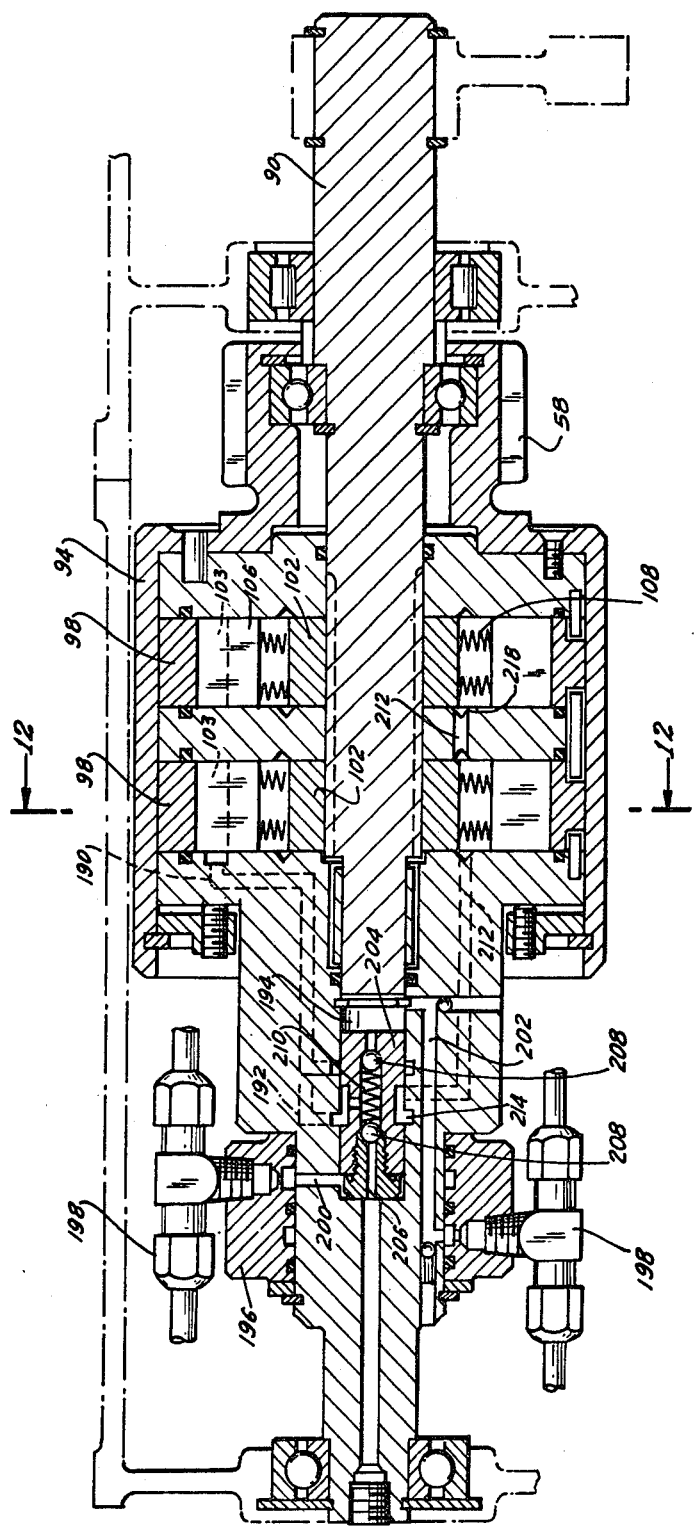

VARIABLE SPEED TRANSMISSION

This is a division of application Ser. No. 945,123, filed Sept. 25, 1978, now U.S. Pat. No. 4,194,407.

The present invention relates to variable speed transmission devices and more particularly to a transmission device which is infinitely variable over a predetermined range.

The infinitely variable transmission of the present invention permits variation in speeds between the power input shaft to the transmission and the power output shaft, as well as torque multiplying and positive drive mechanical power transmission over an extremely broad range of speeds in either forward or reverse directions, from zero to several times the input speed. The output torque with the transmission of the invention is inversely proportional to the output speed with high efficiency throughout its entire range. And, in the transmission of the present construction, there is no apparent torque or power limit too large for the transmission to effectively handle.

Although infinitely variable transmissions have been previously proposed, such transmissions are relatively complex and require a large number of moving parts, such as shown for example in U.S. Pat. Nos. 3,803,931 and 3,229,549. By the construction of the present invention an infinitely variable transmission is provided which is smaller in size and formed of fewer and simpler parts as compared to previously proposed transmissions of this type. Moreover, the transmission is economical to manufacture and should be far easier to maintain than conventional transmissions it is intended to replace. It is believed that the use of this transmission in an automobile could double the automobile's mileage by allowing the automobile engine to operate at its more efficient fuel effective low speed high torque mode more often, regardless of vehicle speed. It also makes the single shaft Brayton engine practicel. In addition, the variable throw feature of the present invention can be used in other types of transmissions apart from auto transmissions of the type with which applicant is principally concerned herein and the novel clutch used in the transmission of the present invention is an important element by itself, and can be used apart from the transmission disclosed herein. In particular, this clutch element can serve as a slip clutch, indexing, overrunning, or centrifugal clutch in many applications. The clutch element does not rely on mechanical parts slipping against one another or jamming as in a sprag clutch, and therefore will be more durable in use.

In accordance with one aspect of the present invention a variable speed transmission is provided which includes a power input shaft and a variable throw crank rotatably mounted with respect to the power input shaft, but connected thereto for rotation with the shaft. The crank has a zero throw position aligned with the axis of rotation of the input shaft, and means are provided for varying the throw of the crank with respect to the power input shaft so that rotation of the power input shaft will cause the crank to rotate about its axis of rotation.

A master link or control plate is rotatably mounted on the crank and means are provided for preventing rotation of the plate on the crank while allowing the plate to move with the crank as the crank rotates within the plate. The transmission also includes a power output shaft and a plurality of clutches operatively connected between the control plate and the output shaft for transmitting power from the plate to the output shaft in response to movement of the plate about the axis of rotation of the power input shaft when the input shaft is rotated and the variable throw crank is out of axial alignment with the input shaft. As a result, the speed of rotation of the output shaft is varied with the eccentricity of the variable throw crank pin. The above described is reverted for many applications.

The above, and other objects, features and advantages of this invention will be apparent in the following detailed description of an illustrative embodiment thereof, which is to be read in connection with the accompanying drawings, wherein:

FIG. 1 is a schematic illustration of one embodiment of the transmission according to the present invention;

FIG. 1a is a schematic view of the control means used for varying the throw of the crank in the device of FIG. 1;

FIG. 2 is a schematic perspective view illustrating the operation of the variable throw clutch of the present invention;

FIG. 3 is a schematic end view illustrating the operation of the variable throw clutch;

FIG. 4 is an end view similar to FIG. 3 showing the oscillation of one of the clutches used in the transmission according to the present invention;

FIG. 5a is a sectional view taken along line 5a—5a in FIG. 5;

FIG. 11 is an enlarged side longitudinal sectional view of one embodiment of a clutch adapted to be used in the transmission of the present invention;

FIG. 13 is a longitudinal sectional view of a variable throw crank constructed in accordance with another embodiment of the invention;

FIG. 13a is an end view, on a reduced scale, taken along line 13a—13a of FIG. 13; and FIG. 14 is a sectional view taken along line 14—14 of FIG. 13.

Figure 5:
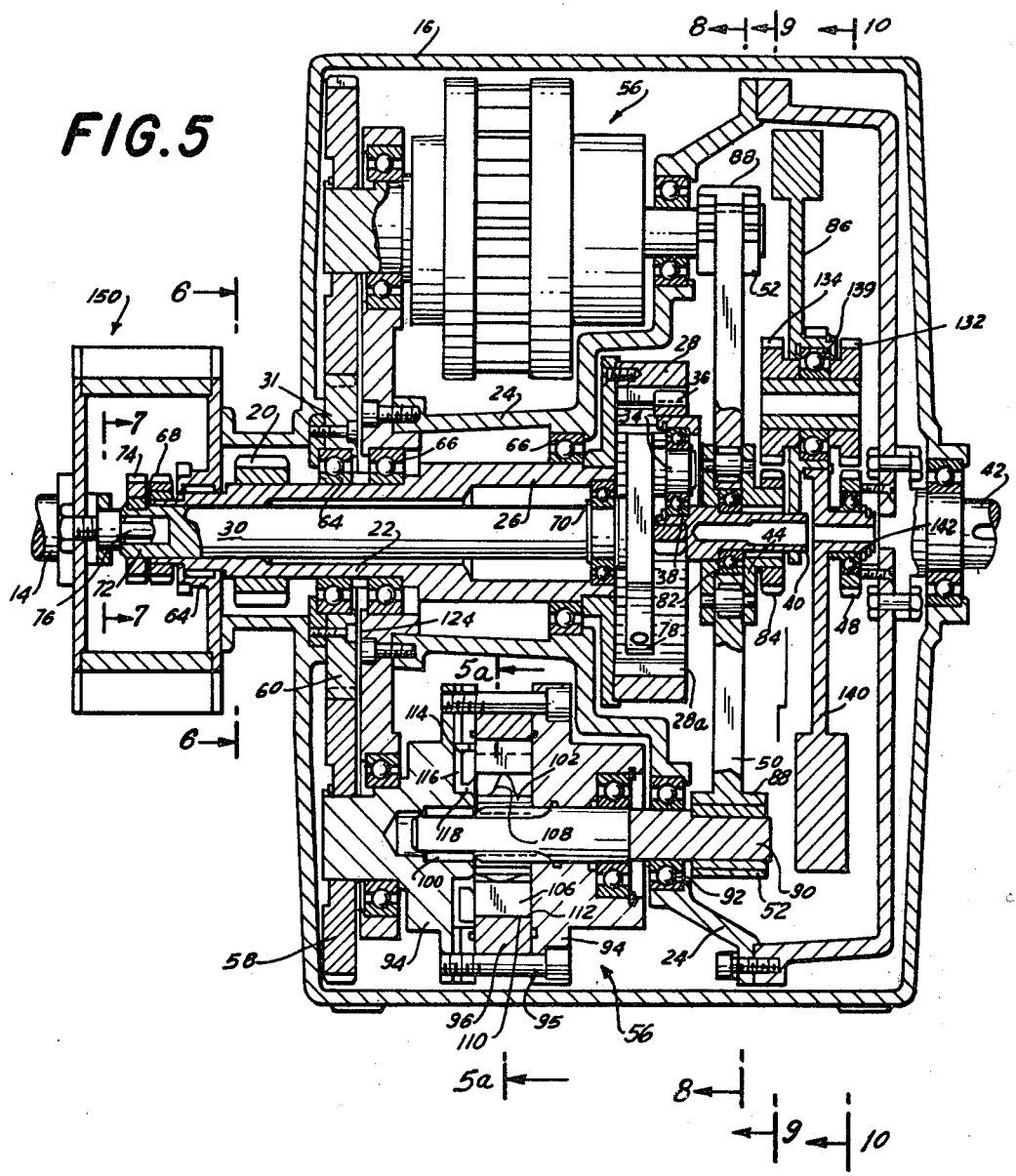
FIG. 5 is a sectional view of a transmission constructed in accordance with the present invention.

Referring now to the drawings in detail and initially to FIG. 1 thereof, an infinitely variable transmission 10, constructed in accordance with the present invention is drivingly connected to a power source 12, e.g. internal combustion engine, having an output drive shaft 14. The transmission is schematically illustrated in FIG. 1, for easier understanding of the invention, and is illustrated in greater detail in subsequent views of the drawings. Essentially the transmission includes a fixed housing 16 into which the output shaft 14 of the engine 12 extends. The engine shaft includes an output gear 18 drivingly engaged with a pinion gear 20 secured to a hollow shaft 22 in the transmission. This shaft is rotatably mounted in housing 16, as described hereinafter, and has a separate sub-housing 24 rotatably mounted thereon. The end 26 of shaft 22 is rigidly secured to a ring gear 28 having internal radially extending teeth.

A control shaft 30 is rotatably mounted within hollow shaft 22 for relative rotation with respect to the hollow shaft. However, a gear assembly 32 is provided which interengages the shafts 22, 30 so that they normally will rotate together when power is supplied from engine 12. Gear assembly 32, as described hereinafter, also will permit the operator of the transmission to selectively rotate shaft 30 within shaft 22 in order to vary the eccentricity of the variable throw crank of the transmission. This crank is connected to shaft 30, within ring gear 28.

The variable throw crank includes a first crank member 34 eccentrically mounted on the end of control shaft 30 and it has a pinion gear 36 rotatably mounted thereon. A second crank 38 is secured to gear 36 for rotation therewith. As illustrated in FIG. 1, crank 38 includes a crank pin 40 which is located, at least in one position, to be in axial alignment with the axis of rotation of shaft 22. By rotating shaft 30 with respect to shaft 22 the center of the pinion gear 36 is displaced relative to ring gear 28, causing gear 36 to rotate relative to gear 28, so that crank pin 40 of crank 38 rotates therewith. This varies the eccentricity of the crank pin with respect to the axis of rotation of shaft 22, as shown schematically in FIG. 2.

When crank pin 40 is aligned with the axis of rotation of shaft 22, joint rotation of shafts 22, 30 will simply cause crank pin 40 to rotate about its central axis, which coincides with the central axis of the shaft 22. However, when the crank pin is moved to an eccentric position with respect to the axis of rotation of shafts 22, 30 it will rotate in a circular path about that axis of rotation. Rotation of the crank pin in this mode is used to operate a series of clutches to transfer power to the output shaft 42 of the transmission, which shaft is fixed to the sub-housing 24.

A control plate or master link 44 is rotatably mounted on crank pin 40. The master link's angular orientation is held relatively fixed with respect to the interior sub-housing 24 through a gear assembly 46 which includes an end gear 48 fixed to housing 24. Thus, while plate 44 will move with crank pin 40, as the crank pin rotates therein, it is held against rotation relative to housing 24 on the crank pin.

A plurality of pitman arms or links 50 are pivotally connected at their opposite ends to master link 44 and to cranks 52 rigidly secured to input shafts 54 of clutches 56. These clutches are constructed, as described hereinafter, such that upon oscillation of their input shafts relative to their output ends, in a first direction, an output gear 58 associated therewith is rotated. The gears are not rotated by the clutch input shafts when the cranks of the clutches are returned in an opposite direction to their original position. The clutches are out of phase with one another, so that as the master link 44 moves with crank pin 40, the clutches sequentially drive their output gears 58. It is noted that plate 44 is termed a master link because for each separate pitman 50 it acts as a separate link connected to the eccentrically moving crank pin to oscillate the pitman. Since the plate is connected to all the pitmans it controls them all, simultaneously and thus is a master link.

Gears 58 are meshingly engaged with a central gear 60 which is fixed in any convenient manner within fixed housing 16. As a result, gear 60 will not rotate upon application of the drive from gears 58. Instead, the reaction of gears 58 against gear 60 will cause sub-housing 24 to rotate, carrying the clutches therewith. Thus, the clutches and master link 44 rotate about the axis of rotation of shaft 22, but the master link 44, while moving about the axis 22 does not rotate relative to housing 24 on its crank pin 40 so that the master link's relative position with respect to the clutches remains constant. In this form of the invention the transmission is reverted with the output drive of the clutches applied to a stator gear which then causes the housing in which the clutches are mounted to rotate. However, it is contemplated that the transmission be non-reverted, with gears 58 drivingly engaged with a rotatably mounted output gear rather than a stator gear and with housing 24 fixed in housing 10. Thus the gears 58 will drive the output gear rather than cause housing 24 to rotate. However, with a reverted gear train it has been found that overdrive transmission ratios can be provided between the input and output shafts and clutch torques in the transmission will be much less than in the non-reverted form of the transmission.

With the transmission as thus described, by simply varying the throw or eccentricity of crank pin 40 with respect to the axis of rotation of drive shaft 22 the amount of oscillation imparted to the input cranks of the clutches can be varied, thereby to vary the speed ratio between input shaft 14 and the output shaft 42. This is more clearly illustrated in FIG. 2 of the drawing, wherein it is seen that crank pin 40 (shown in solid lines) is located in longitudinal alignment with the axis of rotation of shaft 22. In that position when shaft 22 is rotated, shaft 30 rotates therewith and crank pin 40 simply rotates within master link 44 and imparts no movement to the master link. However, when the eccentricity of crank 40 is varied from its zero position to some other position the master link 44 will be moved in a generally circular path of travel as indicated by the phantom line 60 in FIG. 4 with the center of rotation of this path of travel being the axis of shaft 22. Because the master link rotates with the clutch mounting during rotation of the clutch mounting of sub-housing 24, and because it is held against rotation relative to sub-housing 24, on its central axis by the gear assembly 46, movement of the master link about axis 22 will cause links 50 to oscillate cranks 52 of clutches 56 in order to selectively drive to the clutches during one direction of movement of cranks 52. As mentioned, these clutches are out of phase with one another so that a stepwise drive is imparted to sub-housing 24 and thus to output shaft 42. However, because there are a series of clutches a slight ripple effect may be produced by the stepwise drive which will be substantially unnoticed and absorbed by the hysterisis effect of the assembly. In addition, to overcome this ripple effect, particularly in the reverted type of transmission input gears 18, 20 may be lobed to put a ripple drive into the transmission to eliminate the ripple output.

Figure 6:
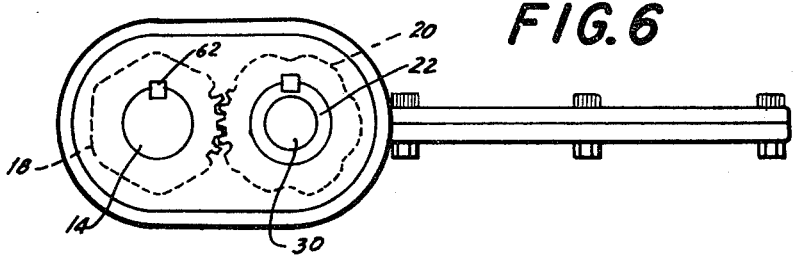
FIG. 6 is an end view taken along line 6—6 of FIG. 5.

Referring to the more detailed illustration of the invention shown in FIG. 5 of the drawings, input shaft 14 of engine 12 is journalled in housing 16, in any convenient manner. As seen in FIG. 6, shaft 14 has the output gear 18 secured thereto by a key 62 or the like, with the gear being in meshing engagement with gear 20 on shaft 22. These gears have a lobed configuration, which places a ripple input into the drive to shaft 30 which counteracts and even entirely removes the ripple effect produced by the crank action. However, these gears may be circular in the non-reverted configuration of the transmission since the ripple effect produced by the clutches is the substantially completely absorbed by the hysterisis effect of the transmission.

Shaft 22 is rotatably mounted in housing 16 by bearings 64 or the like, with sub-housing 24 being rotatably mounted thereon by bearings 66. The left end of shaft 22 has a control gear 68 keyed thereto, while the right end of the shaft has the ring gear 28 mounted thereon. Crank control shaft 30 is rotatably mounted within shaft 22 by a bearing 70 and extends through the shaft to its left end 72 on which a control spur gear 74 is secured. The extreme end 72 of shaft 30 is recessed to receive an end bearing 76 which aids in supporting the assembly of the transmission within housing 16.

The right end of control shaft 30 has an integral crank formed thereon including an eccentric crank pin 34 which is located to be parallel to and offset from the axis of rotation of shafts 22, 30. This crank pin and the mass journalled thereon are balanced by an opposed counterweight 78 and it has a spur gear 36 rotatably mounted thereon in meshing engagement with the inne row of teeth 28a of ring gear 28. Crank 38 is rigidly secured at its inner end to gear 36 for rotation therewith and forms the crank pin 40 which is located so that, in one position of gear 36, the pin is in alignment with the axis of rotation of shafts 22, 30.

The master link 44 is rotatably mounted on crank pin 40 by a bearing 82 and has an integral constraint gear 84 formed therewith. A counterbalance arm 86 is also journalled on crank 40.

The pitman or connecting links 50 are pivotally connected in a generally circular array around master link 44 at their inner ends. The outer ends 88 of these links are pinned (i.e. pivotally connected) to cranks 52 of clutches 56. These cranks are keyed to the clutch shafts 90 which are journalled in sub-housing 24 by bearings 92. As mentioned, sub-housing 24 is rotatably mounted on shaft 22, within fixed housing 16, and has the output shaft 42 of the transmission rigidly secured thereto for rotation with the sub-housing.

Clutches 56 each include clutch housing sections 94 which are bolted together by bolts 95 about a housing ring 96 which defines an internal chamber 98 between the housing sections 94. The clutch shaft 90 extends through this chamber and is rotatably received within housing sections 94 by bearings 100. A rotor 102 (see FIG. 5a) is splined to shaft 90 for rotation therewith. This rotor has a plurality of radially extending slots 104 formed therein which receive radially extending vanes 106. The vanes may be biased upwardly by springs 108 so that the free ends 110 of the vanes are urged by the springs towards the peripheral wall 112 of ring 98. Two diametrically opposed arcuate ports 114 are formed in one of the housing sections 94 adjacent the path of travel of the periphery of rotor 98. These ports feed passages 116 which connects them to an annular pressure ring 118 located in communication with the lower ends 120 of slots 104. As described hereinafter when shaft 90 and rotor 102 are rotated in a first direction, relative to ring 98, hydraulic pressure is built up in the spaces between vanes 106 adjacent ports 114 and causes housing 94 to be wedged with and to rotate with shaft 90. But when shaft 90 is rotated in an opposite direction, that pressure is relieved and the housing sections 94 are undriven.

The left hand housing section 94 of each of the clutches (in the illustrative embodiment of the invention six clutches are arrayed around the sub-housing 24 but more or less than six clutches can be used) have clutch gears 58 secured thereto. These gears are positioned in meshing engagement with fixed gear 60. That gear is secured by bolts 124 to fixed housing 16.

Figure 9:
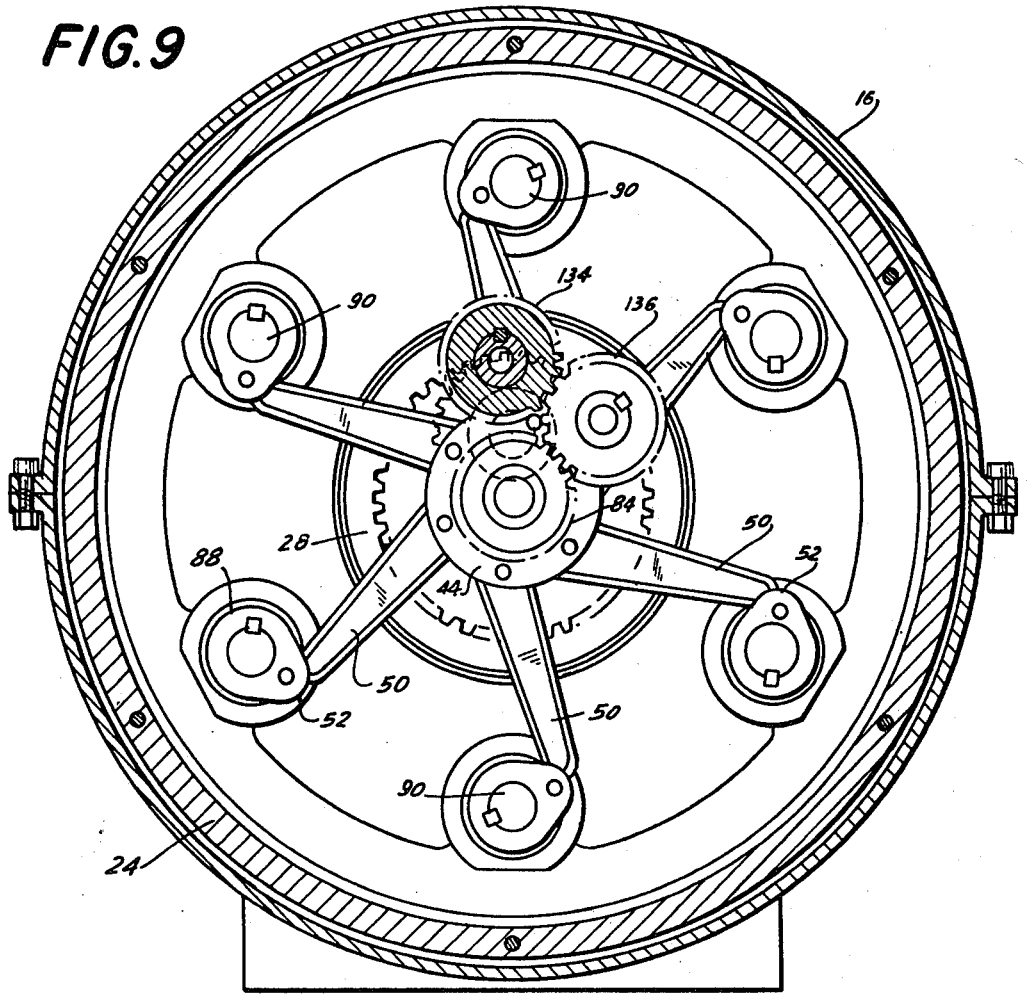
Figure 10:
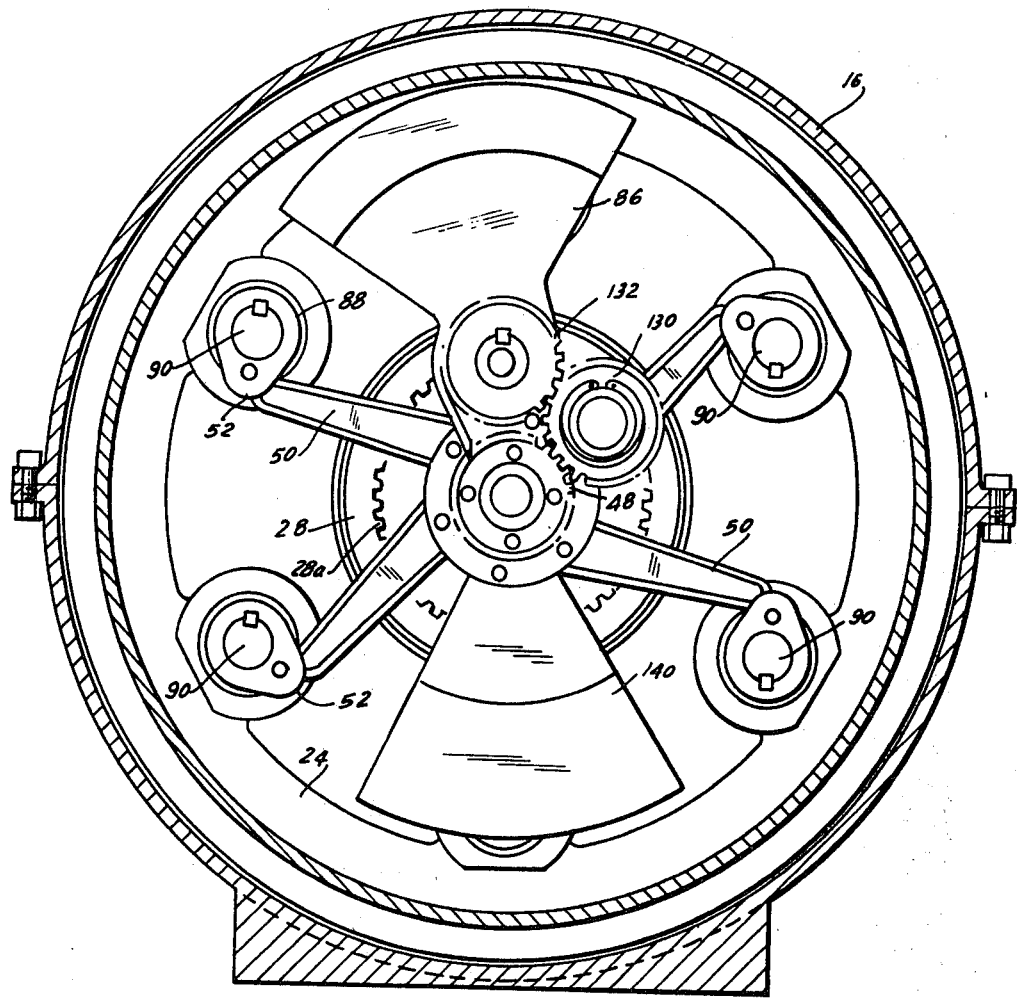

Constraint gear 48 is fixed to sub-housing 24 in any convenient manner for rotation with the sub-housing about the axis of rotation of the shafts 22, 30. As seen in FIG. 10, constraint gear 48 is in meshing engagement with an idler gear 130 which, in turn, is in meshing engagement with a transfer or compound gear 132. That gear includes an integral companion gear 134 which, as seen in FIG. 9, is in meshing engagement with an idler gear 136. The latter is then engaged with the constraint gear 84 secured to control plate 44. The gears 132, 134 are rotatably mounted in the counterweight constraint link 86 by a bearing 139; and an additional counterweight constraint link 140 is journalled on link 86 at bearing 139, as illustrated in FIG. 5, and is also journalled within constraint gear 48 by a bearing 142. This link carries the idler gear 132, while constraint link 86 carries idler gear 136. These gears all cooperate to insure that the master link 44 is held against rotation on crank arm 40 relative to sub-housing 24.

Figure 7:
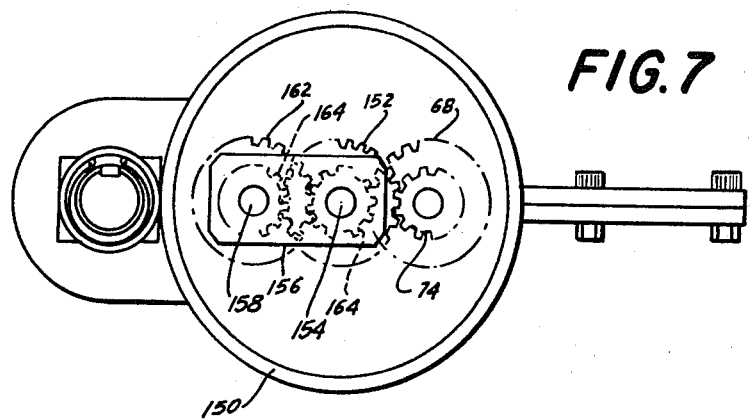
FIG. 7 is an end view taken along line 7—7 of FIG. 5.
Figure 8:
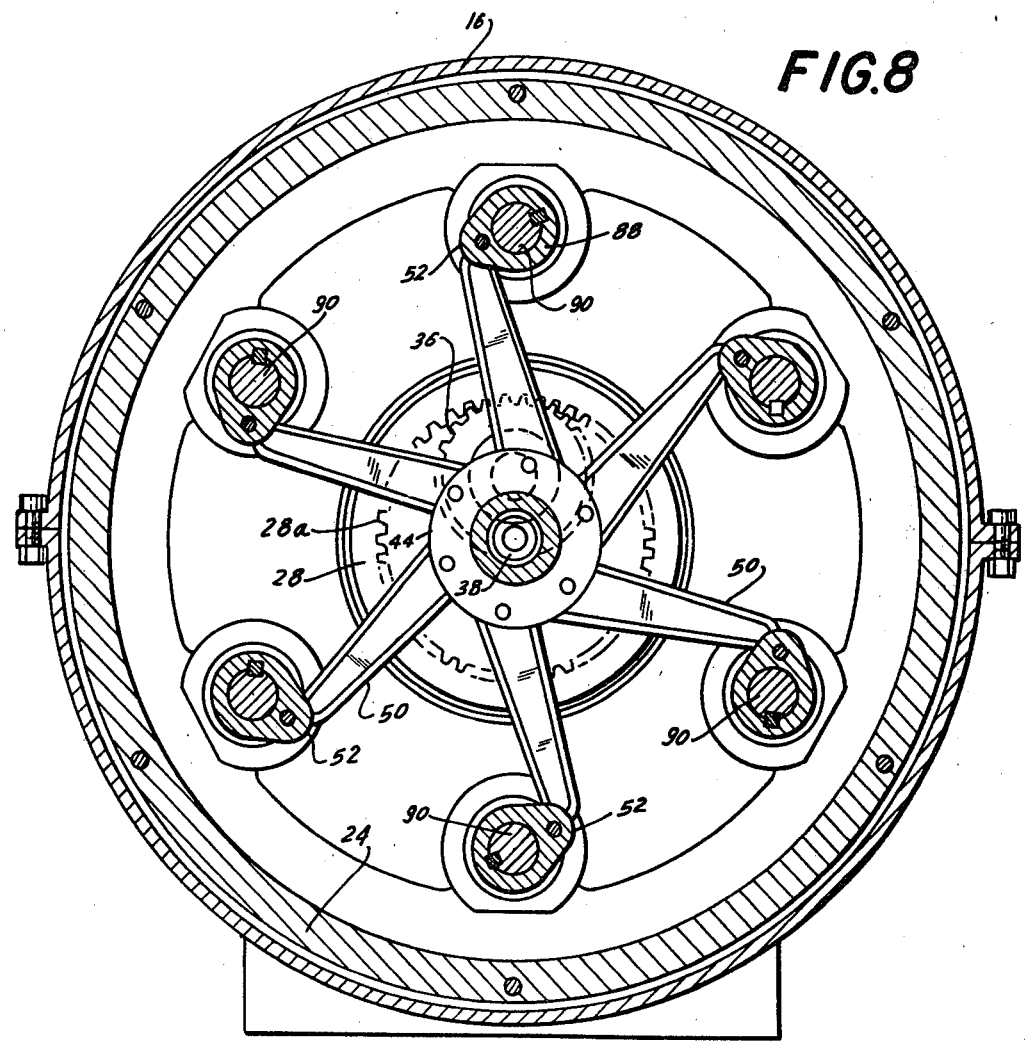
FIGS. 8, 9 and 10 are sectional views taken along the correspondingly numbered lines in FIG. 5.

In the embodiment of the invention illustrated in FIGS. 5 and 7, the eccentricity of crank pin 40 is varied with respect to the axis of rotation of shafts 22, 30 by the gear assembly 32 which is located within a control housing 150 secured to housing 16. This gear assembly 32 includes an idler gear 152 rotatably mounted on a control shaft 154 for relative rotation with respect to that shaft. The control shaft is rotated to rotate shaft 22 relative to shaft 30 in any convenient manner, e.g. by a crank end 155 secured thereto.

A pair of links 156 are secured or keyed to shaft 154 at one end to a shaft 158 at their opposite ends. A compound gear consisting of gears 160, 162 is journalled on shaft 158, with gear 160 meshing with idler gear 152 and gear 162 meshing with an idler gear 164 also journalled on shaft 154. The gears 152, 164 are respectively engaged with the gears 74, 68 on shafts 30 and 22.

When crank 155 (and thus shaft 154) is held in a given position (as for example by a hydraulic control, or manually) and shaft 22 is driven from input shaft 14 of the engine, shaft 30 turns at the same speed and the throw of crank pin 40 remains unchanged, because the ring gear and crank shaft 30 turn together as one. However, if crank 155 is rotated, this rotates links 156 causing gear 74 (which is meshed with gear 152) to turn relative to gear 68 which is in meshing engagement with gear 164. As a result, shaft 30 turns relative to shaft 22 and ring gear 28 so that gear 36, which is in meshing engagement with the ring gear and journalled on crank 34, turns causing crank pin 40 to move relative to the center line of the main shaft, thereby varying the throw of the crank.

Movement of crank 155 may be controlled by a hydraulic double acting cylinder or the like 161 having its piston rod 163 (see FIG. 1a) connected thereto. Fluid supply to the chambers of the cylinder can be controlled in any conventional manner to cause the piston rod to move crank 155 to any desired position and to hold it in the selected position. And, the force then necessary to control crank 155 is very small depending on part only of the input and independent of the output torque of the transmission itself.

In the operation of the invention shown in FIGS. 1 and 5, when the crank pin is in its zero throw position and the engine or motor 12 turns shaft 14, ring gear shaft 22 is rotated by the cooperation of the lobed gears 18, 20, and made to turn at the same average speed in the opposite direction with a ripple motion. The control gear 68, driving through gears 164, 163, 160, 154, 74, turns shaft 30 at the same speed as ring gear shaft 22. Spur gear 36, in meshing engagement with ring gear 28, moves en-masse with the ring gear. The second crank pin 40 turns on the centerline of rotation of, and at the same speed as, ring gear shaft 22. Thus, there is no crank throw to move the clutch shafts so there is no motion put to the output gears 58 of the clutches, and sub-frame or carrier 24 is not made to turn. Likewise, constraint gear 48 does not turn and thus constraint gear 84 fixed to the master link, and the master link itself, does not rotate.

Now, if control shaft 154 is turned to turn link 156 a new motion is added (or subtracted) to the control gears, turning shaft 30 relative to ring gear shaft 22. This causes gear 36, in mesh with the ring gear, to turn, causing secondary crank pin 40 to move away from the zero throw position. In this configuration, when shaft 30 is rotated, crank 40 will cause the master link 44 to move in an orbital path about the axis of rotation of shaft 22. This causes the connecting links 50, pivotally connected between the master link and cranks 52 of the clutches, to oscillate. The master link is held against turning with respect to the sub-housing 24 by the constraint gear arrangement 46.

In order for the clutch motions to be balanced and identical, it is important that master link 44 not turn relative to the clutch shafts 90. This is accomplished by the gear array previously described, including the gears 48, 84, 130–136. By fixing gear 48 on housing 24 in a fixed position with respect to the clutch shafts, so that it cannot turn relative to those shafts and by keeping it on the main centerline of the axis of rotation of the housing, gear 84 is constrained against rotation, regardless of the position of the master link and regardless of how fast links 86, 140 swing around the axis of rotation of the housing 24. (It is noted that except for idlers 130, 136, these gears must all be of the same diameter). Since gears 132, 134 are not rotated gear 84 will not turn either, regardless of how fast or slow its associated link 86 is moved. Thus, the master link is held in a relatively fixed position.

As previously descri-ed all of the clutch housings are coupled by the gears 58 to stator gear 60. When the shafts 90 of the clutches are oscillated in the direction of rotation of the clutch housings, for driving sub-frame 24, at a speed which is equal to or very slightly faster than the speed of rotation of the clutch housing, vanes 106 will try to push oil out through ports 114 so that the shaft may continue to turn. However, there is no place for the oil to go so it builds up pressure in the wedge-shaped area in front of the vanes. This incrased pressure is communicated through ports 116 to the space below the vanes, driving the vanes up against ring 98. As a result, the rotor and housing are wedged together by a hydraulic wedge and they turn together, transmitting rotary power to gears 58. As soon as shaft 90 and rotor 102 start turning slower than the housing, or in an opposite direction relative to the housing, high pressure wants to build up on the other side of the vanes and a lower pressure is found on the side that was previously pressurized adjacent the ports 114. This lower pressure, which is now under the vane, combines with the higher pressure on the opposite side of the vane to push and pull the vane away from the circumference of the housing so that the oil in the clutch can pass freely over the top of the vane from one side to the other and the rotor is effectively declutched from the housing. In this embodiment of the invention the clutch functions essentially as a one way overrunning clutch and the transmission only functions as a one way drive. In this form there is no reverse or load drive from the clutch.

Figure 12:
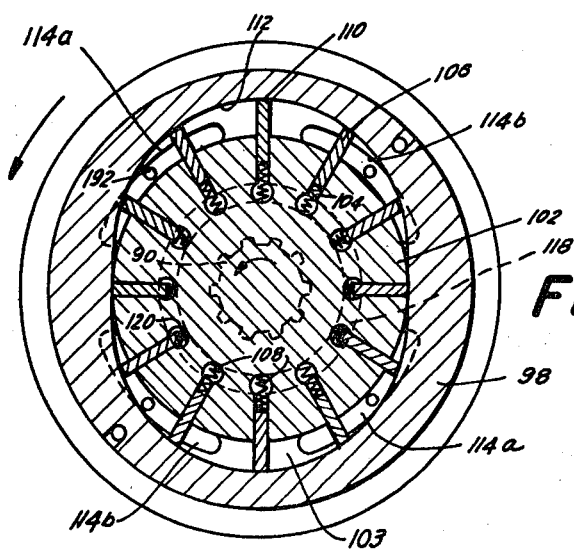
FIG. 12 is a sectional view taken along 12—12 of FIG. 11.

Another embodiment of the clutch of the present invention is illustrated in FIGS. 11 and 12. This clutch is adapted to be used in an automatic automobile transmission (or in any other situation where a reverse drive is required), or where a load drive from the drive wheels of the vehicle to the engine is desired. It also shows means for making up oil that might leak from the clutches. Simplified similar make up means may be used on the first described clutch.

In this embodiment of the invention clutch shaft 90 is journalled in a clutch housing 94 and has a pair of splined rotors 102 secured thereto and located within a pair of complementary chambers 103 formed in the housing within clutch rings 98. Rotors 102 have radially extending vanes 106 slidably mounted in slots 104 therein, which vanes may be biased upwardly by springs or the like 108. As in the prior embodiment, clutch housing rings 98 provide oval shaped cavities, as seen in FIG. 12 of the housing. Although two chambers 103 are used in this illustrative embodiment of the clutch, it is to be understood that the clutch can have a single chamber 103.

In this embodiment of the invention the clutch housing is provided with two pairs of ports, as shown in FIG. 12 (with the ports in the respective pairs being identified as 114*a*, 114*b* for clarity). The pairs of ports are connected by separate passageways 190, 192, to a spool valve bore 194 formed in one end of the clutch housing. A banjo or slip ring 196 is mounted in a fixed position on the housing and supplies hydraulic fluid through fittings 198 to ports 200 and 202 in the clutch housing which lead to opposite ends of spool valve bore 194. The latter slidably contains a spool valve 204 having a through port 206 formed therein closed at opposite ends by check valves or balls 208 biased apart by a centrally located spring 210. In this embodiment of the invention output gear 58 for the clutch housing is integrally formed with the housing and transfer energy from or to the clutch housing and thus from or to shaft 90.

Passageways 212 connect the center recessed portion 214 of the spool valve to high pressure rings or grooves 218 formed in the housing of the clutch adjacent the lower ends of the vane slots in rotor 102.

In operation, with the spool valve blocking passage 190, as seen in FIG. 11, when shaft 90 turns in a counterclockwise direction relative to clutch ring 98 (as shown in FIG. 12) pressure is put on oil leading to ports 114*a* and that same pressure connects through passage 192, spool valve 32, and passage 212 to the high pressure rings 218 putting high pressure oil under vanes 106, keeping them tightly sealed against housing ring 38 and causing wedges of oil to be trapped between the vanes and rotor housing, locking them together during this relative motion. When the relative motions are opposite, i.e. when shaft 90 is oscillated in an oposite direction during its cyclical operation, high pressure wants to build up on the sides of the vanes associated with the ports 114*b*, thereby lowering the pressure appearing in ports 114*a*. The spool valve however blocks passage of fluid from the port 114*b* so that no high pressure oil is fed to rings 218 to push the vanes out to seal against the housing. Instead, suction pressure is passed from ports 114a to beneath vanes 106 to pull the vanes downwardly. Thus, instead of a high pressure oil wedge building up between the right hand side of the vane, the rotor and the housing, the oil that would normally form this wedge passes freely over the top of the retracted vane, and the rotor free wheels relative to the housing. Thus, the rotor and housing are declutched from one another and the whole clutch acts just as a one way sprag clutch.

In order to reverse the clutching action, to get a reverse drive or a load drive, spool valve 204 is simply moved to its other position, at the other end of the bore 194 from that illustrated in FIG. 11. This is done by putting oil under pressure through the banjo 196 and down passageway 202 while at the same time draining oil through the passageway 202 leading in the other side of the spool valve.

The oil in spool valve bore 194 is under pressure during the spool shifting operation. Since the spool valve bore is closed by check valves 204, if the pressure in bore 194 increases above the pressure of oil contained within the clutch chambers due, for example, to a loss of oil through leakage, the check valves will open to permit this shifting oil to enter the clutch housing, and compensate for that lost oil. Thus, the ball check valves keep the high pressure of the wedged clutch oil from leaking out, but let the modest pressure of the shifting oil in during the suction portion of the declutching cycle to make up lost oil.

Accordingly, it is seen that the clutch of the present invention is adapted to serve as a one way or overrunning clutch, but it has no costly sprags or teeth to wear out, and is selectively reversible. By operating the spool valve with a governor device, it becomes a centrifugal clutch. By controlling the speed of the spool valve travel, especially when the spool is tapered at one end, it becomes a slip clutch. The position of the valve in the embodiment of the invention illustrated in the drawing can be controlled in any convenient manner by the operator of the vehicle, and it can even be connected to the foot pedal of the vehicle so that when the operator's foot is released from the gas pedal, spool valve 204 is moved from its leftmost position in FIG. 11 to its rightmost position, so that the drive of the wheels of the vehicle is transmitted back through the transmission to the engine, to aid in slowing the vehicle down and prevent the vehicle from coasting. Also, the spool can be constructed to block all connections to the high pressure ring in one of its positions so that no clutching occurs. In that position the clutches are declutched for both directions of rotation.

Another embodiment of the variable throw crank of the present invention is illustrated in FIG. 13. In this embodiment of the invention an alternative to the ring gear variable throw crank is provided, wherein, in lieu of the joint shafts 22, 30, a single drive shaft 250 is provided that is drivingly connected at one end 251 to the engine or motor through gears 18, 20 or the like. This shaft has an eccentrically located bore or chamber 252 formed at its end 253 and fluid passages 254, 256 are connected at their left ends to a banjo 258 journalled on the shaft and to which oil under pressure is supplied. These bores, as seen in FIG. 14, lead to opposite sides of chamber 252 formed within the shaft 250. In this connection it is noted that chamber 252 is generally cylindrical in cross section and a shaft stop element 258 is positioned within the shaft and secured thereto by a screw 260 or the like. The stop element has a continuation of ports 254, 256 formed therein.

A secondary crank shaft 262 is journalled within bore 252 in very close relationship to stop 258, as seen in FIG. 14. This crank shaft has a vane 264 secured thereto which effectively divides chamber 252 into right and left hand portions. In addition, crank shaft 262 includes an integral eccentric pin 266 formed therewith and extending outwardly from shaft 250. This pin 266 is offset from the axis of rotation of shaft 262 by a distance equal to the offset of the axis of rotation of shaft 262 from the axis of rotation of shaft 250 (see FIG. 13a). The end plate 268, bolted to shaft 250, closes the open end of chamber 252 and serves as a journal for shaft 262.

By supplying oil under pressure to one side of chamber 252, through one of the ports 254, 256, while relieving pressure from the other port, shaft 262 will be rotated, thereby varying the position of crank pin 266. By supplying oil to the left chamber section as seen in FIG. 14, and relieving pressure from the right chamber, the crank pin will be rotated in a clockwise direction until vane 264 is stopped by engagement with stop 258, at which point crank pin 266 is located in axial alignment with the axis of rotation of shaft 250. By supplying oil under pressure in the opposite direction, the eccentricity of crank pin 266 can be varied. This crank pin corresponds to crank pin 40 of the previously described embodiment, and therefore when it is in an eccentric position with respect to the axis of rotation of shaft 250, it will cause the master link or plate 44 to oscillate, thereby driving the clutches associated therewith.

In this embodiment of the invention, it is noted that the torque arm of the variable throw crank is the line from the center of main shaft 250 to the center of crank pin or shaft 262. This line forms the base of an osoceles triangle whose apex is the center of bore 252. As a result, the maximum turning torque on vane 264 is one half the input torque regardless of how big the output torque of the transmission using this crank might be shifting oil comes from an auxiliary oil pump and is fed into the crank position and through the fittings on banjo 258 and then through the passages 254, 256 by either manual or automatic means.

FIG. 14 also illustrates a system for automatically controlling the throw of the crank pin 266 in response to engine speed and load. As seen therein, a micro switch 300 is connected to the gas pedal 302 of an automobile to control the engine's throttle. When the pedal 302 is depressed by the operator it opens the throttle 304 of the engine to its fully open position through a conventional throttle control system (not shown); and, when no pressure is placed on pedal 302 the throttle is fully closed. The pedal 302 is also connected to a valve 306 through a linkage 307 which controls the supply of oil, under pressure from a source thereof 308 through valve 309 to the port 254 to urge vane 264 in a clockwise direction, while connecting port 254 to drain.

In addition, the flywheel governor 310 for the engine is used to control another valve 312 to control supply of oil under pressure from source 308 to port 254. In this manner the positioning of vane 264 and thus the throw of crank pin 40 is controlled in response to the engine speed and the load on the engine. Thus, if the engine is operating too fast for the load on the transmission the valve 312 will supply oil under pressure to valve 309 to shift the valve to the right and connect high pressure oil to port 254 while connecting port 256 to drain, thereby to shift the transmission to a higher gear ratio and thus slow the engine down. Accordingly the transmission serves to mate the output to the load so that the engine operates at minimum efficiency.

This control system can also be used to control positioning of cranks 155 of the previously described variable through crank by controlling the supply of pressurized oil to the chambers of cylinder 161.

As with the clutches described above, the variable throw cranks of the present invention can be used as products unto themselves, or in other applications apart from drive transmissions. Thus applicant's invention in the construction of these features is not limited to automobile transmissions.

From the above it is seen that the output speed and torque of the transmission according to the present invention are proportional to the throw of the variable crank. When the crank throw is zero inches the output shaft driven by the crank turns at zero speed regardless of how fast the engine turns the crank or input shaft. When the crank throw is set at its maximum the output shaft turns at its maximum speed. The top speed ratio in the reverted transmission may be greater than 1:1, and at intermediate throws the output shaft will be dirven at intermediate speeds. The output torque is inversely proportionate to the output speed. The construction of the transmission is rugged and simple, and it can be manufactured at relatively low cost. In the transmission the crank throw is easily changed under load, and since the secondary crank is balanced by counterweights in the illustrative embodiments, and since the total mass of the secondary crank and the primary crank is also balanced by the counterweights, the adjustable throw is always in near perfect radial balance.

Accordingly, the transmission of the present invention provides a reversible, infinitely variable, positive drive torque multiplying transmission of great simplicity and high efficiency. The device is low in cost, can be made in very small sizes or in extremely large sizes, is light in weight and will be practically maintenance free.

Because the transmissions provide a far larger range of ratios than conventional transmissions, they can halve the fuel consumption of a conventional automobile and allow smaller engines to give superior performance.

Although illustrative embodiments of the present invention have been described herein with reference to the accompanying drawings, it is to be understood that the invention is not limited to those precise embodiments, and that various changes and modifications may be effected therein by one skilled in the art without departing from the scope or spirit of this invention.

What is claimed is:

1. A clutch comprising a housing having a non-circular chamber formed therein; a shaft rotatably mounted in said housing and extending through said chamber, a rotor body secured to said shaft in said chamber for rotation therein, said rotor body having a plurality of radially extending slots formed therein; means in said body for providing fluid communication between the lower ends of said slots and the portion of the chamber surrounding the rotor; a plurality of radially extending vanes respectively slidably mounted in said slots for radial movement with respect to said rotor; said vanes dividing said chamber into a plurality of spaces between the vanes about the rotor; hydraulic fluid in said spaces and slots below the vanes whereby said shaft will drive said housing through said fluid when the shaft is rotated faster than the rotation, in the same direction, of said housing, and means for reversing the driving direction of the clutch including means for selectively permitting fluid to pass from some of said spaces to the bottom of said slots.

2. A clutch as defined in claim 1 including spring means in said slots for biasing said vanes radially outwardly.

3. A clutch as defined in claim 1 wherein said chamber is generally oval in shape.

* * * * *